US009038023B2

(12) United States Patent
Zenz et al.

(10) Patent No.: US 9,038,023 B2
(45) Date of Patent: May 19, 2015

(54) TEMPLATE-BASED CONFIGURATION ARCHITECTURE

(75) Inventors: Ingo Zenz, Epfenbach (DE); Frank Kilian, Mannheim (DE); Krasimir Semerdhziev, Sofia (BG)

(73) Assignee: SAP SE, Walldorf (DE)

( * ) Notice: Subject to any disclaimer, the term of this patent is extended or adjusted under 35 U.S.C. 154(b) by 1622 days.

(21) Appl. No.: 11/322,509

(22) Filed: Dec. 30, 2005

(65) Prior Publication Data

US 2007/0162892 A1 Jul. 12, 2007

(51) Int. Cl.
*G06F 9/44* (2006.01)
*G06F 9/445* (2006.01)

(52) U.S. Cl.
CPC .................................. *G06F 9/44505* (2013.01)

(58) Field of Classification Search
None
See application file for complete search history.

(56) References Cited

U.S. PATENT DOCUMENTS 5,479,599 A * 12/1995 Rockwell et al. ............ 715/837
5,608,865 A 3/1997 Midgely et al.
5,758,154 A 5/1998 Qureshi
5,832,503 A 11/1998 Malik et al.
5,903,894 A * 5/1999 Reneris ...................... 707/999.1
5,996,012 A 11/1999 Jarriel
6,041,347 A 3/2000 Harsham et al.
6,055,227 A 4/2000 Lennert et al.
6,148,277 A 11/2000 Asava et al.
6,161,176 A 12/2000 Hunter et al.
6,209,018 B1 3/2001 Ben-Shachar et al.
6,314,460 B1 11/2001 Knight et al.
6,341,372 B1 * 1/2002 Datig ............................ 717/136
6,397,378 B1 * 5/2002 Grey et al. .................... 717/175
6,421,719 B1 7/2002 Lewis et al.
6,490,690 B1 12/2002 Gusler et al.
6,735,691 B1 5/2004 Capps et al.
6,832,298 B2 12/2004 Fujii et al.
6,871,221 B1 3/2005 Styles
6,898,703 B1 5/2005 Ogami et al.
6,925,646 B1 8/2005 Korenshtein et al.
6,950,931 B2 9/2005 Wedlake
6,996,517 B1 2/2006 Papaefstathiou
7,054,924 B1 5/2006 Harvey et al.
7,167,974 B2 1/2007 Roth et al.
7,188,335 B1 * 3/2007 Darr et al. ..................... 717/121
7,246,345 B1 * 7/2007 Sharma et al. ................ 717/120
7,260,818 B1 * 8/2007 Iterum et al. .................. 717/170

(Continued)

FOREIGN PATENT DOCUMENTS

EP 1486867 A1 12/2004
GB 2374687 10/2002

(Continued)

OTHER PUBLICATIONS

Schlee, et al. "Generative Programming of Graphical User Interfaces", 2004, ACM, p. 403-406.*

(Continued)

*Primary Examiner* — Qamrun Nahar
(74) *Attorney, Agent, or Firm* — Schwegman Lundberg & Woessner, P.A.

(57) ABSTRACT

A system and method are provided for template-based configuration architecture. Configuration information from a first level is inherited. Configuration templates are customized via the inherited configuration information based on usage at a second level. The customized configuration templates are applied to default instances at a third level.

14 Claims, 6 Drawing Sheets

200

LEVEL 1 (e.g., Global level or default configuration) 202
Deployed Components 210
Component Binaries 212
Default Component Configuration 214
LEVEL 2 (e.g., Configuration Templates) 204
Component Binaries 216
Component Configuration 218
Basic Instance 220
number_of_nodes
Basic Instance Customized 238
Templates 222
Minimal Instance 224
J2EE Developer 226
Portal + KM 228
... 230
LEVEL 3 (e.g., System Configuration) 206
Customizing Layer 232
Customized J2EE Developer 234
Customized Portal + KM 236
Instances 240
System 244
J2EE Dev Instance_1
J2EE Dev Instance_m 242
Portal + KM Instance_1
Portal + KM Instance_n 244
Current Instance (Virtual) 246

(56) References Cited

U.S. PATENT DOCUMENTS

| | | | | |
|---|---|---|---|---|
| 7,320,007 | B1 | 1/2008 | Chang | |
| 7,343,601 | B2 * | 3/2008 | Azagury et al. | 717/176 |
| 7,373,661 | B2 | 5/2008 | Smith et al. | |
| 7,412,687 | B2 | 8/2008 | Goodwin et al. | |
| 7,447,701 | B2 | 11/2008 | Agarwal et al. | |
| 7,480,643 | B2 | 1/2009 | Barsness et al. | |
| 7,793,087 | B2 | 9/2010 | Zenz et al. | |
| 7,797,522 | B2 | 9/2010 | Zenz et al. | |
| 2003/0041235 | A1 | 2/2003 | Meyer | |
| 2003/0055529 | A1 | 3/2003 | Aosawa | |
| 2003/0221094 | A1 | 11/2003 | Pennarun | |
| 2003/0225867 | A1 * | 12/2003 | Wedlake | 709/222 |
| 2004/0117452 | A1 | 6/2004 | Lee et al. | |
| 2004/0162930 | A1 | 8/2004 | Forin et al. | |
| 2004/0187140 | A1 | 9/2004 | Aigner et al. | |
| 2004/0205584 | A1 | 10/2004 | Pezzanite | |
| 2004/0230787 | A1 | 11/2004 | Blumenau et al. | |
| 2005/0005005 | A1 | 1/2005 | Styles et al. | |
| 2005/0050175 | A1 | 3/2005 | Fong et al. | |
| 2005/0065993 | A1 | 3/2005 | Honda et al. | |
| 2005/0071195 | A1 | 3/2005 | Cassel et al. | |
| 2005/0085937 | A1 | 4/2005 | Goodwin et al. | |
| 2005/0144428 | A1 | 6/2005 | Rothman et al. | |
| 2005/0144528 | A1 | 6/2005 | Bucher et al. | |
| 2005/0144610 | A1 * | 6/2005 | Zenz | 717/168 |
| 2005/0240667 | A1 | 10/2005 | Koegel | |
| 2005/0289169 | A1 | 12/2005 | Adya et al. | |
| 2006/0041595 | A1 | 2/2006 | Taguchi et al. | |
| 2006/0041881 | A1 * | 2/2006 | Adkasthala | 717/168 |
| 2006/0047798 | A1 | 3/2006 | Feinleib et al. | |
| 2006/0064673 | A1 * | 3/2006 | Rogers et al. | 717/113 |
| 2006/0123409 | A1 | 6/2006 | Jordan, III et al. | |
| 2006/0150178 | A1 | 7/2006 | Jerrard-Dunne et al. | |
| 2006/0165123 | A1 | 7/2006 | Jerrard-Dunne et al. | |
| 2006/0190579 | A1 | 8/2006 | Rachniowski et al. | |
| 2006/0242626 | A1 * | 10/2006 | Pham et al. | 717/121 |
| 2006/0242634 | A1 | 10/2006 | Fleischer et al. | |
| 2007/0094359 | A1 | 4/2007 | Lamoureux | |
| 2007/0118654 | A1 | 5/2007 | Jamkhedkar | |
| 2007/0118888 | A1 | 5/2007 | Styles | |
| 2007/0143480 | A1 | 6/2007 | Arroyo et al. | |
| 2007/0156388 | A1 | 7/2007 | Kilian et al. | |
| 2007/0156389 | A1 | 7/2007 | Kilian et al. | |
| 2007/0156432 | A1 | 7/2007 | Mueller et al. | |
| 2007/0156641 | A1 | 7/2007 | Mueller | |
| 2007/0156715 | A1 | 7/2007 | Mueller | |
| 2007/0156717 | A1 | 7/2007 | Zenz et al. | |
| 2007/0157010 | A1 | 7/2007 | Zenz | |
| 2007/0157172 | A1 * | 7/2007 | Zenz et al. | 717/121 |
| 2007/0157185 | A1 | 7/2007 | Semerdzhiev | |
| 2007/0165937 | A1 | 7/2007 | Mladen et al. | |
| 2007/0168965 | A1 | 7/2007 | Zenz | |
| 2007/0257715 | A1 | 11/2007 | Semerdzhiev et al. | |

FOREIGN PATENT DOCUMENTS

| | | | |
|---|---|---|---|
| WO | WO-9626588 | A1 | 8/1996 |
| WO | WO2004109978 | | 12/2004 |
| WO | WO2005/045670 | | 5/2005 |
| WO | WO-2007076944 | A1 | 7/2007 |

OTHER PUBLICATIONS

Feiler, P. H. "Software Process Support Through Software Configuration Management", 1990, IEEE, p. 58-60.*

Int'l Application No. PCT/EP2006/012421, Int'l Search Report & Written Opinion dated Oct. 2, 2007, 14 pages.

OA Mailed Feb. 20, 2008 for U.S. Appl. No. 11/322,608, (Feb. 20, 2008), Whole Document , p. 1-10. QN Jan. 13, 2009.

Heiss, Kurt , "Oracle Process Manager and Notification Server Administrator's Guide, 10g Release 2 (10.1.2)", 10g Release 2 (10. 1.2) Dec. 2004 XP002449016; Redwood City, CA, USA, Retrieved from the Internet: URL: http://download.oracle.com/docs/cd/B14 [ret'd on Aug. 31, 2007], (Dec. 2004), pp. 1-1 to pp. 1-26 and pp. 3-1 to pp. 3-30.

USPTO, OA Mailed May 22, 2008 for U.S. Appl. No. 11/322,401, (May 22, 2008), Whole Document , p. 1-10. QN Jan. 13, 2009.

USPTO, OA Mailed May 23, 2008 for U.S. Appl. No. 11/322,400, (May 23, 2008), Whole Document , p. 1-13. QN Jan. 13, 2009.

USPTO, OA mailed Jan. 8, 2008 for U.S. Appl. No. 11/322,607, (Jan. 8, 2008), Whole Document , p. 1-16. QN Jan. 13, 2009.

USPTO, Office Action mailed Mar. 19, 2008 for U.S. Appl. No. 11/322,701, Whole Document , (Mar. 19, 2008) , p. 1-12. QN Jan. 13, 2009.

USPTO, Office Action mailed Jun. 26, 2008 for U.S. Appl. No. 11/322,607, (Jun. 26, 2008) , p. 1-16. QN Jan. 13, 2009.

PCT International Search Report , mailing date Jun. 14, 2007, PCT/ EP2006/012358,,5 pgs.

U.S. Appl. No. 11/322,400, Notice of Allowance mailed May 18, 2009, 7 pgs.

U.S. Appl. No. 11/322,401, Advisory Action mailed Feb. 26, 2009, 5 pgs.

U.S. Appl. No. 11/322,401, Final Office Action mailed Nov. 19, 2008, 7 pgs.

U.S. Appl. No. 11/322,401, Non Final Office Action mailed May 21, 2009, 10 pgs.

U.S. Appl. No. 11/322,401, Non Final Office Action mailed May 22, 2008, 7 pgs.

U.S. Appl. No. 11/322,401, Notice of Allowance mailed Dec. 31, 2009, 4 Pgs.

U.S. Appl. No. 11/322,401, Preliminary Amendment filed Mar. 16, 2009, 11 pgs.

U.S. Appl. No. 11/322,401, Response filed Feb. 19, 2009 to Final Office Action mailed Nov. 19, 2008, 7 pgs.

U.S. Appl. No. 11/322,401, Response filed Aug. 22, 2008 to Non Final Office Action mailed May 22, 2008, 17 pgs.

U.S. Appl. No. 11/322,401, Response filed Sep. 16, 2009 to Non Final Office Action mailed May 21, 2009, 10 pgs.

U.S. Appl. No. 11/322,607, Non Final Office Action mailed Jan. 8, 2008, 10 pgs.

U.S. Appl. No. 11/322,608, Final Office Action mailed Jul. 8, 2009, 9 pgs.

U.S. Appl. No. 11/322,701, Final Office Action mailed Sep. 2, 2008, 16 pgs.

U.S. Appl. No. 11/322,701, Non-Final Office Action mailed Jul. 6, 2009, 15 pgs.

U.S. Appl. No. 11/322,969, Non-Final Office Action mailed Apr. 1, 2009, 11 pgs.

U.S. Appl. No. 11/322,969, Response filed Jun. 9, 2009 to Non Final Office Action mailed Apr. 1, 2009, 11 pgs.

U.S. Appl. No. 11/323,110 , Notice of Allowance mailed Oct. 20, 2009, 6 pgs.

U.S. Appl. No. 11/323,110, Non Final Office Action mailed Nov. 26, 2008, 10 pgs.

U.S. Appl. No. 11/323,110, Notice of Allowance mailed May 29, 2009, 9 pgs.

U.S. Appl. No. 11/323,110, Response filed Feb. 25, 2009 to Non Final Office Action mailed Nov. 26, 2008, 9 pgs.

U.S. Appl. No. 11/323,110, Response filed Oct. 27, 2008 to Restriction Requirement mailed Aug. 27, 2008, 10 pgs.

U.S. Appl. No. 11/323,110, Restriction Requirement mailed Aug. 27, 2008, 7 pgs.

U.S. Appl. No. 11/323,438, Non Final Office Action mailed Apr. 1, 2009, 21 pgs.

U.S. Appl. No. 11/323,438, Response filed Jun. 30, 2009 to Non Final Office Action mailed Apr. 1, 2009, 14 pgs.

International Application Serial No. PCT/EP2006/012356, International Search Report and Written Opinion mailed Mar. 29, 2007, 8 pgs.

International Application Serial No. PCT/EP2006/012357, International Search Report and Written Opinion mailed Mar. 29, 2007, 9 pgs.

"Using a Template Processor to Simplify Programming", *Research Disclosure, Mason Publications*, Hampshire, GB, vol. 41, No. 413, (Sep. 1, 1998), 3 pgs.

(56) References Cited

OTHER PUBLICATIONS

Feller, Peter H., "Software Process Support Through Software Configuration Management", *IEEE*, (1990), 58-60.
Hall, et al., "Design: A Generic Configuration Shell, Proc of the 3rd International Conf. on industrial and engineering applications of artificial intelligence and expert systems", vol. 1, Charleston, SC 1990, 500-508 pgs.
Karlsson, et al., "Method Configuration: Adapting to situational characteristics while creating reusable assets", *Information and software Technology*, vol. 46, Issue 9, (Jul. 1, 2004), 619-633 pgs.
Leffler, et al., "Building Berkeley UNIX Kernels with Config", *Computer Systems research Group*, (Apr. 17, 1991), 2-1 and 2-31 pgs .
Robbins, et al., "Unix in a nutshell", 3rd edition, O'Reily & Associates, Inc, (Aug. 1999), 215-221 and 265-266 pgs.
Schwanke, et al., "Configuration Management in BiiN SMS", *Proc. of the 11th International Conf. on software engineering Pittsburgh*, (383-393 pgs), 1989.
Symantec, Corp., "Norton Ghost™User's Guide", *Norton Ghost™User'Guide—Symantec. Norton Ghost the fast pc cloning Solution*., (1999), 138 pgs.
Williams, et al., "Embedded Linux as a platform for dynamically self-reconfiguration systems-On-Chip", (21-24 pgs), 163-169 pgs.
Final Office Action for U.S. Appl. No. 11/322,608 Mailed Sep. 4, 2008, whole document, Whole Document.
Final Office Action for U.S. Appl. No. 11/322,401 Mailed Nov. 19, 2008, whole document, Whole Document.
Non-Final Office Action for U.S. Appl. No. 11/323,110 Mailed Nov. 26, 2008, whole document., Whole Document.
Non-Final Office Action for U.S. Appl. No. 11/324,125, Mailed Jan. 23, 2009, whole document., Whole Document.
Non-Final Office Action for U.S. Appl. No. 11/322,511, Mailed Jan. 22, 2009, whole document., Whole Document.
Non-Final Office Action for U.S. Appl. No. 11/322,608, Mailed Feb. 13, 2009, 10 pages.
"J2EE Engine Bootstrap", *BIS Techdev J2EEEnqineBoostrap "J2EE Engine Bootstrap"*, pp. 1-15, printed on Sep. 26, 2005 https://bis.wdf.sap.corp/twiki/bin/view/Techdev/J2EEEnqineBootstrap.
Accomazzi, Alberto , et al., "Mirroring the ADS Bibliographic Databases", *Astronomical Analysis Software and Systems VII*, ASP Conference Series, vol. 145, (1998), 395-399.
Bartell, Randy L., et al., "The Mediaxact System—A Framework for Personalized Electronic Commerce Systems", Bell Labs Technical Journal, vol. 4, Issues 153-173, (Apr.-Jun. 1999), 153-173.
Cutler, Ellie , "SCO Unix in a Nutsell", *O'Reilly & Associates, Inc.*, Cambridge, MA (Jan. 1994), 154-158.
Duquette, William H., et al., "Data Definition and Code Generation in TCL", *RIDE-VE '99*, Sydney, Australia, (Mar. 23-24, 1999), 1-10.
Feiler, Peter H., "Software Process Support Through Software Configuration Management", 1990, IEEE, pp. 58-60.
Fernandez, Mary , et al., "Silkroute: Trading Between Relations and XML", *Computer Networks*, vol. 33, Issues 1-6, (Jun. 2000), 723-745.
Hatley, John W., "Automatically Generating Procedure Code and Database Maintenance Scripts", *Ingres World*, Chicago, IL, (Oct. 2-6, 1994), 1-11.
Microsoft Press, "Microsoft Computer Dictionary", 4th Edition, Redmond, WA, (1999), 123 and 183.
Schlee, Max , et al., "Generative Programming of Graphical User Interfaces", 2004, *ACM*, pp. 403-406.
USPTO, FOA dated Sep. 2, 2008, U.S. Appl. No. 11/322,701, (Sep. 2, 2008), Whole Document.
U.S. Appl. No. 11/322,401, Ex-Parte Reexamination Office Action Mailed Mar. 30, 2010, 4 pgs.
U.S. Appl. No. 11/322,401, Notice of Allowance mailed Jun. 1, 2010, 5 pgs.
U.S. Appl. No. 11/322,401, Response filed Apr. 14, 2010 to Ex Parte Quayle Action mailed Mar. 30, 2010, 4 pgs.
U.S. Appl. No. 11/323,110, Notice of Allowance mailed Feb. 17, 2010, 4 Pgs.

* cited by examiner

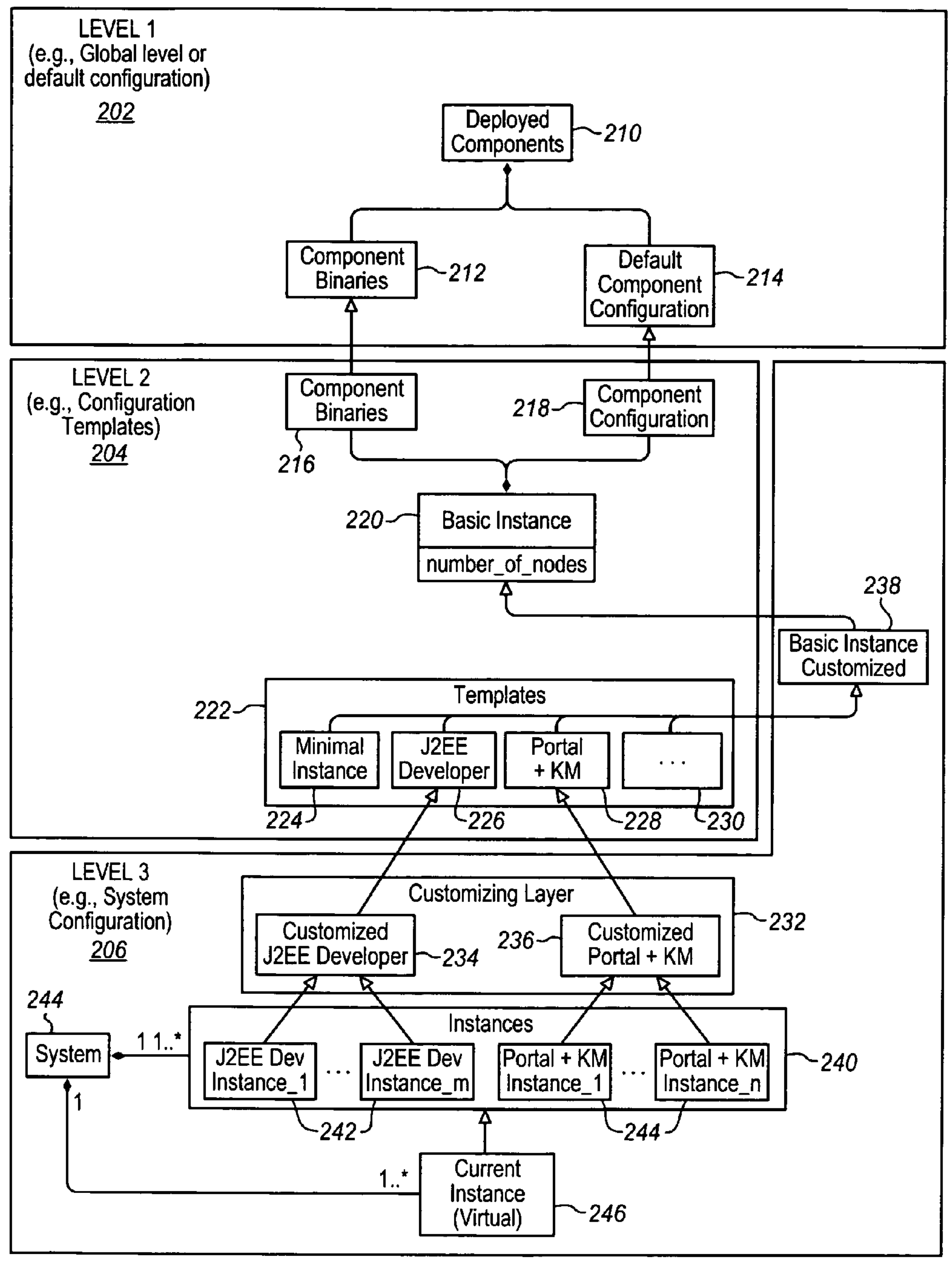

FIG. 2
200
LEVEL 1
(e.g., Global level or default configuration)
202
Deployed Components
210
Component Binaries
212
Default Component Configuration
214
LEVEL 2
(e.g., Configuration Templates)
204
Component Binaries
216
218
Component Configuration
220
Basic Instance
number_of_nodes
238
Basic Instance Customized
222
Templates
Minimal Instance
J2EE Developer
Portal + KM
. . .
224
226
228
230
LEVEL 3
(e.g., System Configuration)
206
Customizing Layer
232
Customized J2EE Developer
234
236
Customized Portal + KM
244
System
1 1..*
Instances
J2EE Dev Instance_1
J2EE Dev Instance_m
Portal + KM Instance_1
Portal + KM Instance_n
240
1
242
244
1..*
Current Instance (Virtual)
246

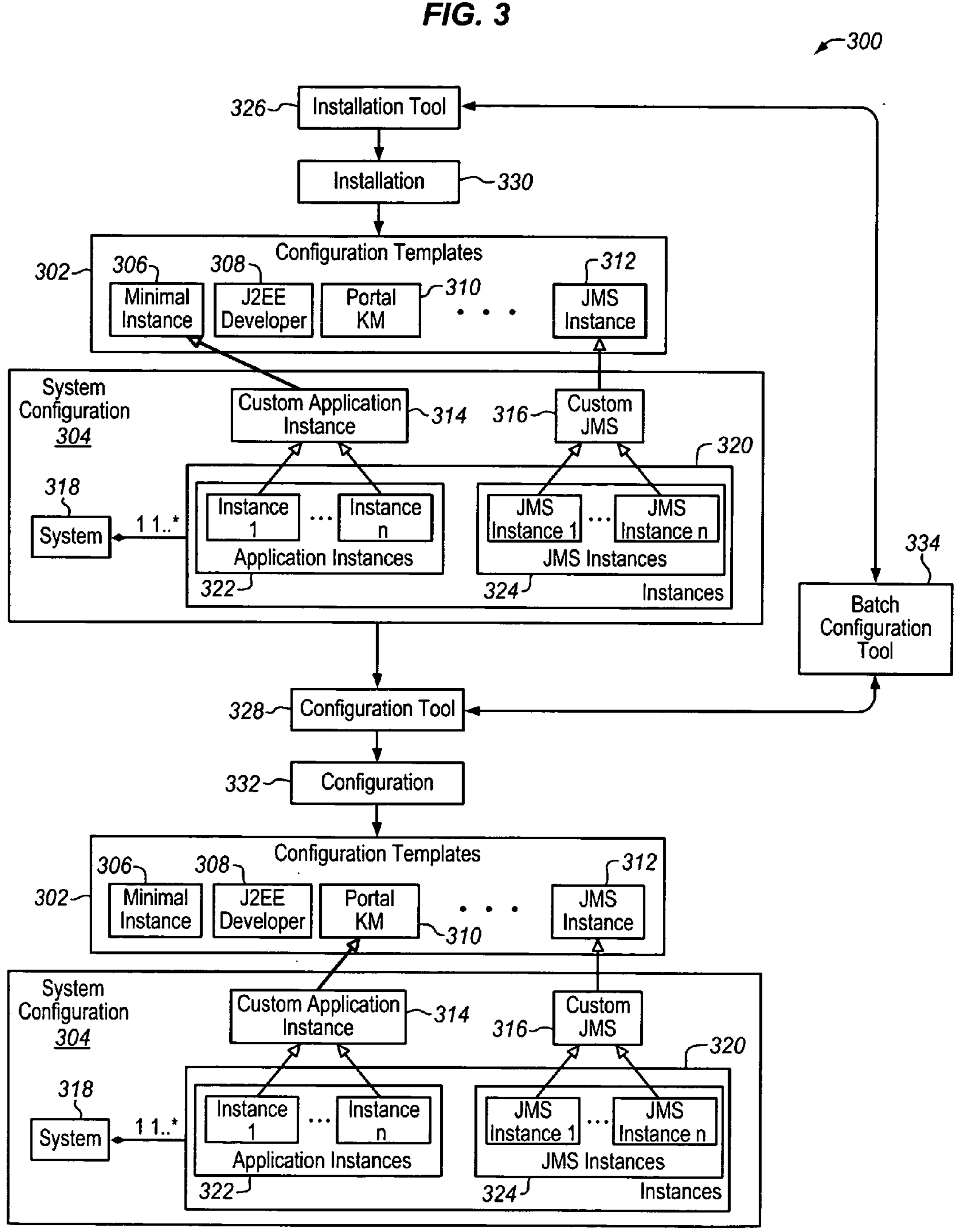
FIG. 3
300
326
Installation Tool
Installation
330
302
Configuration Templates
306
Minimal Instance
308
J2EE Developer
Portal KM
310
312
JMS Instance
System Configuration 304
Custom Application Instance
314
316
Custom JMS
320
318
System
1 1..*
Instance 1
Instance n
Application Instances
JMS Instance 1
JMS Instance n
JMS Instances
322
324
Instances
334
Batch Configuration Tool
328
Configuration Tool
332
Configuration
302
Configuration Templates
306
Minimal Instance
308
J2EE Developer
Portal KM
310
312
JMS Instance
System Configuration 304
Custom Application Instance
314
316
Custom JMS
320
318
System
1 1..*
Instance 1
Instance n
Application Instances
JMS Instance 1
JMS Instance n
JMS Instances
322
324
Instances

TEMPLATE-BASED CONFIGURATION ARCHITECTURE

FIELD

Embodiments of this invention relate generally to installation and configuration of enterprise software, and in particular but not exclusively, relate to providing template-based configuration structure in an enterprise environment.

BACKGROUND

FIG. 1 illustrates a prior art enterprise system 100. AS instances 105 may be web application servers, such as Web AS by SAP AG of Walldorf, Germany. AS instances 105 provide a framework to deploy a variety of business and presentation software packages for use in an enterprise environment. AS instances 105 are installed on one or more machines 110 and grouped into a cluster 115. The cluster 115 of AS instances 105 are provided to service work requests 120 received from client nodes 125. Cluster 115 may further include a message server node 130 supporting a message server 135, a database node 140 supporting a database 145, and a web dispatcher 150.

Each AS instance 105 may include one or more virtual machines (VMs) 155 to interpret programs providing the presentation and business logic to service work requests 120. These VM machines may be JAVAVMs (JVMs) compliant with the JAVA 2 Platform, Standard Edition (J2SE), etc. A VM is an example of a runtime system. A VM is an abstract machine that can include an instruction set, a set of registers, a stack, a heap, and a method area, like a real machine or processor. A VM essentially acts as an interface between program code and the actual processor or hardware platform on which the program code is to be executed.

Web dispatcher 150 implements a load-balancing mechanism distributing work requests 120 from client nodes 125 among machines 110 within cluster 115. Web dispatcher 150 may be one of machines 110 having the task of dispatching work requests 120 among machines 110 of cluster 115 or a stand alone hardware node. Work requests 120 are processed by machines 110 and may subsequently be provided to database node 140. Database node 140 offers up the requested data to machines 110, which in turn process and format the results for display on client nodes 125. Each AS instance 105 may further include its own dispatcher mechanism to distribute work requests 120 assigned to it among its individual VMs 155.

Installation files 160 for installing AS instances 105 may be centrally stored within database 145. To deploy each AS instances 105, installation files 160 are copied from database node 140 to each machine 110 via a network link. Once copied, installation files 160 are installed generating a file system and establishing AS instances 105 on each machine 110. When freshly installed, each AS instance 105 is deployed with a default configuration installation for VMs 155 and the applications and services deployed therewith. AS instances 105 may be operated using the default configuration installation; however, this does not guarantee that all available resources will be utilized optimally or that AS instances 105 will function properly.

Typically, once each AS instance 105 is up and running with the default installation configuration, a user manually configures each AS instance 105. Manual configuration generally requires a sophisticated knowledge about the hardware and OS platforms, as well as, the tasks to be performed by each AS instance 105. The user configuring a default installation configuration may need to determine and input a large number of parameters unique to each AS instance 105 in a time consuming and error prone processes.

Furthermore, the conventional configuration technique with the JAVA stack relies on system-dependent information which is heavily and redundantly distributed across the entire cluster configuration tree. This, for example, makes it impossible to adjust the configuration when system settings (e.g., JAVA home, system name, instance number, host names, etc.) are changed. Also, since system-dependent settings are statically configured within the configuration database, when the system environment changes (e.g., due a system copy), these settings are to be adapted manually, which makes it impossible to move a configuration, as is, from one system to another. Further, there is a high risk of inconsistent configuration of cluster nodes running on the same instance

SUMMARY

A system and method are provided for template-based configuration architecture. In one embodiment, configuration information from a first level is inherited. Configuration templates are customized via the inherited configuration information based on usage at a second level. The customized configuration templates are applied to default instances at a third level. In one embodiment, the first level includes a default configuration level, the second level includes a configuration templates level, and the third level includes a system configuration level.

The above attributes may be implemented using a computer program, a method, a system or apparatus, or any combination of computer programs, methods, or systems. These and other details of one or more embodiments of the invention are set forth in the accompanying drawings and in the description below.

BRIEF DESCRIPTION OF THE DRAWINGS

Embodiments are illustrated by way of example and not by way of limitation in the figures of the accompanying drawings in which like references indicate similar elements unless otherwise specified. It should be noted that references to "an" or "one" embodiment in this disclosure are not necessarily to the same embodiment, and such references mean at least one.

FIG. 2 illustrates an embodiment of a configuration architecture.

FIG. 3 illustrates an embodiment of installation and configuration of components.

DETAILED DESCRIPTION

Figure 1:
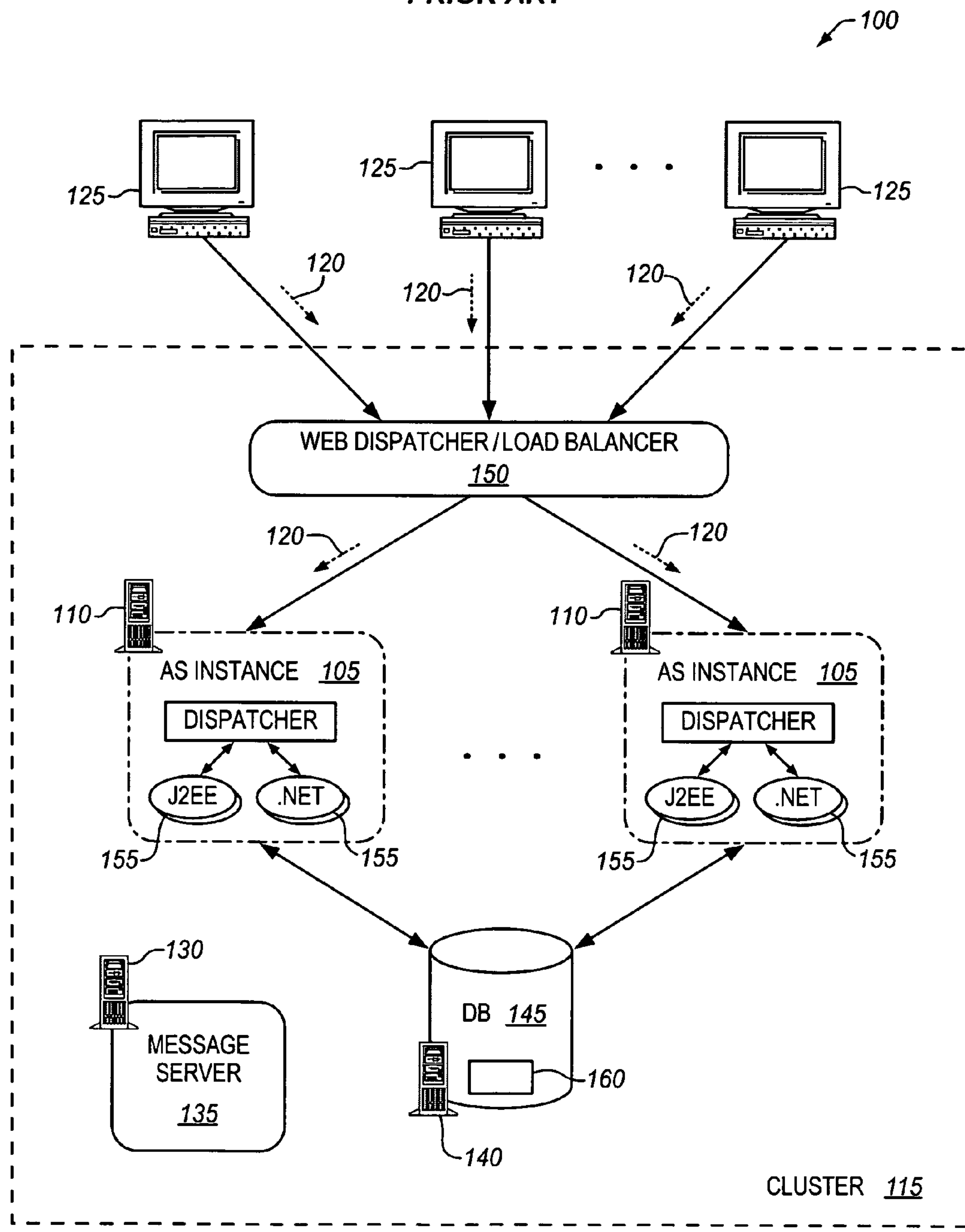
FIG. 1 illustrates a prior art enterprise system.

FIG. 2 illustrates an embodiment of a configuration architecture 200. In one embodiment, configuration architecture 200 provides dynamic configuration that is not system-based, i.e., it is dynamic and system-independent. For example, a change in the system environment may dynamically change the overall configuration. Changes in the system environment, such as system name, instance name, hosts, JAVA home, etc., are made without changing the configuration in the configuration database. This may also help support loadbased installation and system copies with a minimum of reconfiguration overhead. Further, additional hardware may dynamically change the instance layout (e.g., the number of server nodes is calculated out of the available memory and the number of processors). Configuration architecture 200 further provides template-based configuration such templates 222 may contain the engine's use case scenario-specific configuration. Further, an instance 240 may be configured according to a configuration template 222. In one embodiment, instances 240 include server nodes (e.g., VMs, JVMs, etc.), JAVA Management System (JMS) instances, application instances, etc. For example, a single instance 242 may include a homogenous set of server nodes (e.g., JVMs). While one instance may run on one physical machine, a single physical machine may have running multiple instances 240. A collection of instances 242, 244 may be referred to as cluster of instances 240. A cluster 240 may span over several physical machines.

Configuration architecture 200 depicts a general cluster configuration structure which is presented here in three levels 202, 204, 206. In one embodiment, the three levels include deployed components and default configuration level (level 1) 202, configuration template level (level 2) 204, and system configuration level (level 3) 206. Lower levels derive or inherit from higher levels and may overwrite settings. For examples, from bottom up, level 3 206 includes instance configuration level which inherits from level 2 204 which inherits from deployed components and default configuration 202. Level 1 202, generally, and/or deployed components 210, specifically, may be referred to as "global area" or "global." Customer-side modifications may be made at level 3 206, while the content delivered by the provider (e.g., SAP AG) may be kept separate from and independent of customer modifications.

In one embodiment, default configuration level or level 1 202 may provide a system-independent default configuration that is abstract and derived from standard instance via deployed default component configuration 214. This configuration information is inherited at basic instance 220 where the information from level 1 202 is aggregated and further inherited at basic instance customized 238. Configuration information at basic instance customized 238 may then be used to generate templates 222 that are use- or usage-specific. Level 1 202 may also include component binaries 212 that are inherited at component binaries 216 at level 2 204 and aggregated at basic instance 220 along with configuration information from component configuration 218. At basic instance 220, a number of nodes, the configuration of which may be abstract, may also be assigned to basic instance 220.

Configuration template level or level 2 204 may include predefined instance configuration for specific use cases and scenarios, such as portal+KM, minimal instance, JAVA 2 Platform, Enterprise Edition (J2EE) developer, etc. For example, at level 3 206, instances 240 in communication with system 244 include J2EE developer instances 242 and portal+KM instances 244 that are provided via customized J2EE developer 234 and customized portal+KM 236, respectively, at customized layer 232 further via templates J2EE 226 and portal+KM 228 of templates 222 at configuration template 204. Current instance 246 may include a virtual instance that has a parameterized link to an instance 240 running in a given system context (e.g., containing the instance identification as parameter). During runtime, configuration consumers access current instance 246 that points to the right instance from instances 240 during runtime. Stated differently, at runtime, current instance 246 is assigned to a particular instance of instances 240 that the component can access In one embodiment, level 2 204 contains a system-independent configuration that is configured or provided via dynamic configuration that includes parameterized settings, computed settings and/or value links. This system-independent configuration may be moved between different systems with ease. Further, level 2 204 and its contents are derived from default configuration and overwrite the settings according to each of the specific usages to which templates 222 are assigned. Also, instances 240 are homogenously configured, which means all server nodes (e.g., virtual machines) of instances 240 may share the one and the same configuration.

Level 2 204 contains several configurations, such as instance layout configuration, VM configuration, kernel configuration, service settings, application configuration, cluster file system configurations, and runtime filter configuration, etc. For example, the instance layout may contain the configuration about the number of server nodes running on that particular instance. The instance layout may be configured via a simple numeric property which specifies the number of server nodes. This property is by default defined as an arithmetic expression dependent on the hardware available for the instance (e.g., dependent on the number of processors and the amount of available memory). Thus, the instance layout dynamically adapts itself to the environment on which the instance is running. In a high-end environment, an instance may include a higher number of server nodes, where in a low-end environment (e.g., developer personal computer), merely a single server node may be running on the instance.

Similarly, a VM or JVM configuration may contain VM memory settings and parameters. These settings are specified in a system-independent way via parameterized and computed configuration entries. The maximum heap size could, for example, be configured as an arithmetic expression dependent on the amount of physical memory and the number of server nodes running on a particular instance. These settings are dynamically adapted to a specific environment. A kernel configuration may contain system-independent properties of the manager components of the engine. These settings are abstracted via parameterized and computed settings. Service settings may contain system-independent service properties of each service component which is part of the installation. As with the VM and kernel configurations, these settings are abstracted via parameterized and computed settings. An application configuration may contain system-independent application configuration of each application which is part of the installation.

A cluster file system configuration may contain the system-independent configuration of components that are deployed into the file system (e.g., configuration tool, visual administration, etc.). The bootstrap process may be responsible for synchronizing this configuration (along with components themselves) to the file system. During synchronization, a configuration manager may transparently substitute dynamic settings, and thus, in the file systems, the settings may be static. A runtime filter configuration may contain the configuration to enable and disable components according to the use case/scenario associated with templates 222. The installation may contain more components than those that are actually used in a specific use case and scenario. Those components that are not needed are disabled, and those components that are needed are enabled via runtime filter configuration. For example, in J2EE developer template 226, the runtime filter configuration may disable every component except those components that are needed in a J2EE developer scenario.

In one embodiment, configuration templates 222 are derived from configuration basic instance 220, which defines the basic structure of the instance configuration. Further, this derivation may not be direct, but instead, another level basic instance customized 238 may exist in between basic instance 220 and configuration templates 222. Basic instance customized 238 may belong to system configuration and is the place where system global configuration changes can be stored. While the deployment of templates 222 occurs at level 2 204, the modification or customization of templates 222 can be performed at level 3 206 via Application Programming Interfaces (APIs) and administrative tools. Minimal instance 224 includes a template that is used during the instance installation and contains components that are needed to run the central configuration. A central configuration may be used to select and set the specific usage case template for instances 240 to be configured.

In one embodiment, a template configuration tool may be used to generate and configure templates 222 and to provide functionalities for managing the general flow of the auto-configuration process. For example, the auto-configuration process may activate an already existing template 222 by assigning one or more of system instances 240 to that template 222. Templates 222 may include use- or usage-based templates that are system-independent, but they may include any combination of software platform dependent parameters, hardware platform dependent parameters, and/or use-case dependent parameters.

System configuration 206 may contain an actual configuration, such as a configuration of the actual instance 240 belonging to a system. Each instance 240 may be assigned a usage-case scenario which is to be executed by the corresponding instance 240 during runtime. Thus, the instance configuration is derived from configuration templates 222 associated with the corresponding use case and scenario. Further, templates 222 contain system dependencies dynamically (e.g., via parameterized and computed settings), so there is no need to overwrite these settings in the actual instance configuration. Various configurations may dynamically adapt themselves to an actual system environment. Therefore, the engine runtime itself may not need any additional configuration, so it is functional without overwriting any settings inherited from templates 222.

Some engine components (e.g., configuring landscape connectivity, etc.) may, however, be configured at customizing layer 232 associated with templates 222. For example, when an instance 242 for a specific configuration template 226 is generated, a customizing configuration 234 for the template 226 is created with system configuration 206. Further, a customizing configuration 234 is derived from an actual template 226, while an instance configuration 242 is derived from the customizing layer 234 of a selected template 226. Any configuration changes at the level of customizing layer 232 may be visible across instances 240 that are associated with configuration templates 222. For example, any configuration changes at the level of customized portal+KM 236 apply to all portal+KM instances 244 within the cluster.

In one embodiment, when configuration changes in a single instance 242-244 is needed, such changes may be made to a particular instance 242-244 at the instance level at system configuration 206. However, in certain cases, when changes in configuration settings are needed for the entire system, such as system 244 (e.g., for all usages that are activated in system 244), the changes may be made for all instances, such as J2EE developer and portal+KM instances 242-244, in communication with system 244. In this case, configuration changes may be made at the level of basic instance customized 238 which are then inherited down to instances 240 via templates 222 and customizing layer 232. Also, such configuration changes or settings may be visible globally as long as the settings are not locally overwritten. It is to be noted that for brevity and clarity, merely the illustrated instances 240, templates 222, etc., are provided, but many more and fewer instances, templates, and other components, modules, etc., may be employed. For example, one or more of instances 240 may be configured via the same configuration template.

FIG. 3 illustrates an embodiment of installation and configuration of components. As illustrated, system configuration 332 may be decoupled from system installation 330. In one embodiment, installation tool 326 provides installation 330, while configuration tool 328 provides configuration 332 for system 318. During system installation 330, via installation tool 326, one or more instances 320 with a minimum configuration are installed via minimal instance template 306. Minimal instance 306 may contain components that are needed to run central configuration 332. A central configuration may be used, via configuration tool 328, to select and set a specific usage-based template for instances 320 as well as for configuring existing custom values.

In one embodiment, installation 330 provides an entire system database (e.g., J2EE configuration) and a complete file system environment which is needed. For example, installation 330 provides an instance installation that provides a file system environment for instances 320 and prepares instances 320 within the configuration database. For example, the two based kinds of instance configuration may include (1) application instances 322 and JMS instances 324 that are optionally installed in case JMS services are separated from applications. When installing application instances 322, a particular usage of the instance may not be defined at this point; however, the usage may be later defined during configuration 332. Thus, during installation 330, first, minimal instance 306 is configured as it contains all the necessary components needed to subsequently run central configuration 332. Minimal instance 306 may be configured via an appropriate configuration template. Further, the instance installation may be performed via a batch configuration tool provided by the engine to create the instance configuration in the database and assign it to minimal instance configuration template 306.

For installing JMS instances 324, JMS instance configuration template 312 may be used. JMS instance 312 may be made available as part of the configuration database. During the installation 330 of JMS instances 324, the installation tool 326 may use a batch configuration tool to create the instance configuration in the database and assign it to JMS instance configuration template 312.

Central configuration 332 is performed via configuration tool 328 that, for example, runs within the J2EE engine. Configuration tool 328 may be used to manage the configuration of system landscapes via corresponding configuration templates 302. The management of configuration templates 302 by configuration tool 328 may not only merely include one or more of instances 320, but also a landscape of several systems. For example, J2EE configuration templates within the J2EE engine may also be configured based on usages. Configuration 332 may be broader in scope than a typical J2EE configuration. For example, configuration tool 328 may help facilitate activation and/or customization of templates 302. Various J2EE configuration templates may be made available in software delivery archive (SDA) that is deployed into the J2EE engine prior to installing and configuring J2EE instances. Configuration tool 328 may use J2EE configuration templates during configuration 332 by assigning each instance configuration to the appropriate J2EE configuration template. After the installation of templates 302, configuration 302 may also provide activation and/or customization of templates 302.

As discussed previously, during installation 330 of application instances 322, the usage of instances 322 may not be known; however, during installation 330, application instances 322 are configured via minimal instance 306, which may be sufficient to run central configuration 332. Subsequently, during configuration 332, application instances 322 are to be configured for specific usages. During configuration 332, a custom layer configuration (e.g., the layer from which instance configurations are derived), including custom application instance 314, may be assigned to a configuration template (e.g., portal+KM 310) according to a particular usage of the system 318. This custom configuration (e.g., custom application instance 314) may be derived from a selected configuration template (e.g., portal+KM 310), while the instance configuration of application instances 322 may be obtained from the custom configuration.

In one embodiment, configuration templates 302 provided within the 2EE engine are system-independent (e.g., obtained by configuring the system-dependent settings via parameterized and arithmetic expressions), and thus, the settings are correct and do not need to be changed or reviewed during configuration 332. This is particularly necessary for certain settings/modifications, such as instance layouts, VM configurations, kernel configurations, several system-dependent application and service settings, etc. The customizing of additional engine components (e.g., configuring landscape connectivity, etc.) may still be performed. For example, when certain settings are to be modified for all instances (e.g., JMS instance 1 thru JMS instance n of JMS instances 324), using configuration tool 328, configuration 332 may involve modifying such settings by accessing custom configurations (e.g., custom JMS 316, etc.) corresponding to those instances and making changes there. However, when configuration settings of a particular instance (e.g., JMS instance 1 of JMS instances 324) are to be changed, such settings may be changed at the level of that particular instance, such as by directly modifying configuration settings of a JMS instance 1.

Furthermore, a J2EE configuration tool belonging to the J2EE engine core layer may be used for an offline configuration of the J2EE engine system. This configuration provides a configuration for instance layouts (e.g., the number of nodes running on an instance), VMs or JVMs according to VM types and platforms, kernel (e.g., manager) properties, service properties, application properties (e.g., sap.application.global.properties), and runtime filters for activation and deactivation of components according to a particular usage, etc., as described with reference to FIG. 2. Further, a J2EE configuration tool may allow the modification of configuration at the following two levels: (1) particular instance 322-324; and (2) configuration template 306-312. For example, when changing the configuration at the level of a particular instance (e.g., instance 1 of application instances 322), the change is made merely to the specific instance. However, when changing the configuration at the level of a configuration template (e.g., JMS instance 312), this configuration change may impact all those instances (e.g., JMS instances 324) that correspond to and are configured via that particular configuration template. The J2EE configuration tool may not provide the editing of configuration template 302, but instead, it may allow for the editing of custom templates 314-316 for specific configuration templates 302. Using this technique, customer settings are kept separated from the default settings provided by the provider (e.g., SAP AG) that are deployed into the system.

Figure 4:
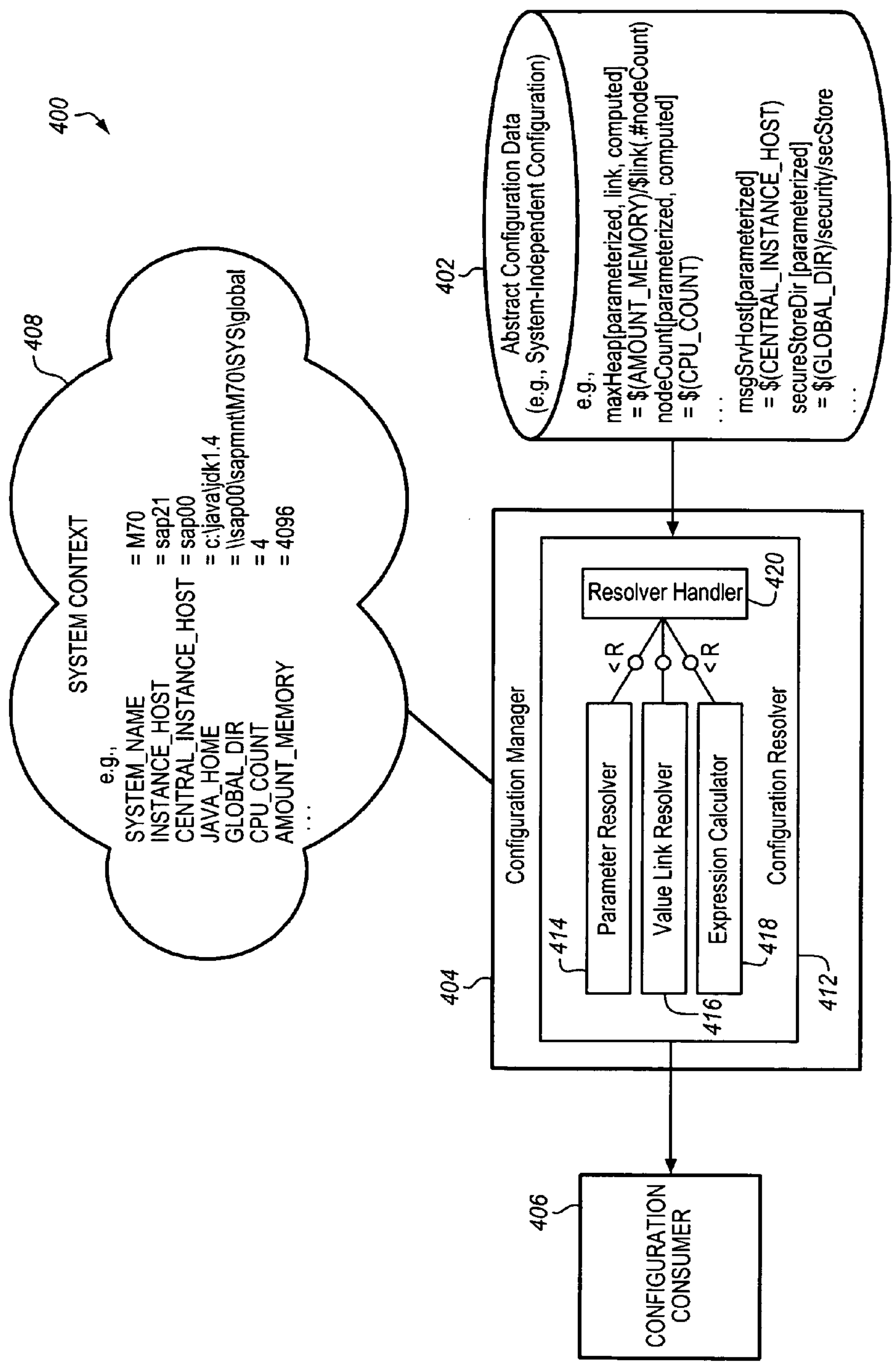
FIG. 4 illustrates an embodiment of a configuration architecture.

FIG. 4 illustrates an embodiment of a configuration architecture 400. In one embodiment, abstract configuration architecture 400 provides for how various components may define their configuration in a system-independent manner. Abstract configuration architecture 400 includes abstract configuration data 402 coupled with configuration manager or machine 404 and further coupled with configuration consumer 406. Abstract configuration data 402 includes meta attributes that are attached to various settings stored at abstract configuration data 402. These meta attributes of abstract configuration data 402 are communicated to configuration manager 404.

Configuration manager 404 may include configuration resolver 412, which further includes resolver handler 420, parameter resolver 414, value link resolver 416, and expression calculator 418. Once the meta attributes from abstract configuration data 402 are communicated to configuration manager 404, based on these meta attributes (e.g., parameterized, link, and/or computed), various resolvers are called for parameter resolver 414, value link resolver 416, and/or expression calculator 418. Furthermore, system context 408 corresponds to the same configuration data (e.g., due to system copy, etc.) and is communicated to configuration manager 404. A resolved configuration is then communicated to configuration consumer 406. System context 408 defines system, system name, etc., having different areas of inputs in system context 408. Any relevant hardware information may be gathered automatically via an operating system. Although, users may provide some installation settings (e.g., system name, instance name, etc.) during installation, host names may be gathered from the operating system.

In one embodiment, configuration manager 404 allows the configuration to be dynamic and to adapt itself to a specific system environment. This is achieved by configuration manager 404 by providing parameterized configuration entries and computed configuration entries. The dynamic configuration as provided by configuration manager 404 permits the use of the parameterized settings rather than the static values. Stated differently, configuration manager 404 accesses a set of system parameters (e.g., host names, instance name, number of processors, available memory, etc.) which are defined during a startup time. Using configuration manager 404, the configuration settings, which depend on the system environment, are not configured as static values, but instead, they reference those system parameters that are accessed by configuration manager 404. This is accomplished by configuration manager 404 by providing various types of configuration settings, such as parameterized settings, value link settings, computed settings, and inherited settings.

The parameterized settings containing system parameters may be provided by configuration manager 404 and are resolved via parameter resolver 414. These parameters may be transparently substituted during runtime. The parameterized settings may also be used for system dependent settings, which can be resolved by a simple parameter substitution. Various computed settings include simple arithmetic expressions containing system parameters from a system profile provided within configuration manager 404. These computed settings are provided via expression calculator 418. During runtime, the parameters are transparently substituted and the arithmetic expression is evaluated. The computed settings are used when a simple parameter substitution is not sufficient and the value needs to be calculated out of specific system parameters (e.g., cache sizes, heap size, etc.). Settings containing a link to other settings (e.g., value link) are used when a setting is dependent on another setting which is stored elsewhere. During runtime, the value link is transparently resolved and substituted. Value link settings are resolved via value link resolver 416. The settings containing value links may be combined with various features of computed values. Using these settings, for example, configuration manager 404 allows J2EE engine components to adapt their configuration dynamically to the system environment in which they are running. The changing of the system environment, which changes system parameters, dynamically changes the configuration. Configuration manager 404 and other components of abstract configuration architecture 400 allow various components to define their configuration such that they are system-independent.

Figure 5:
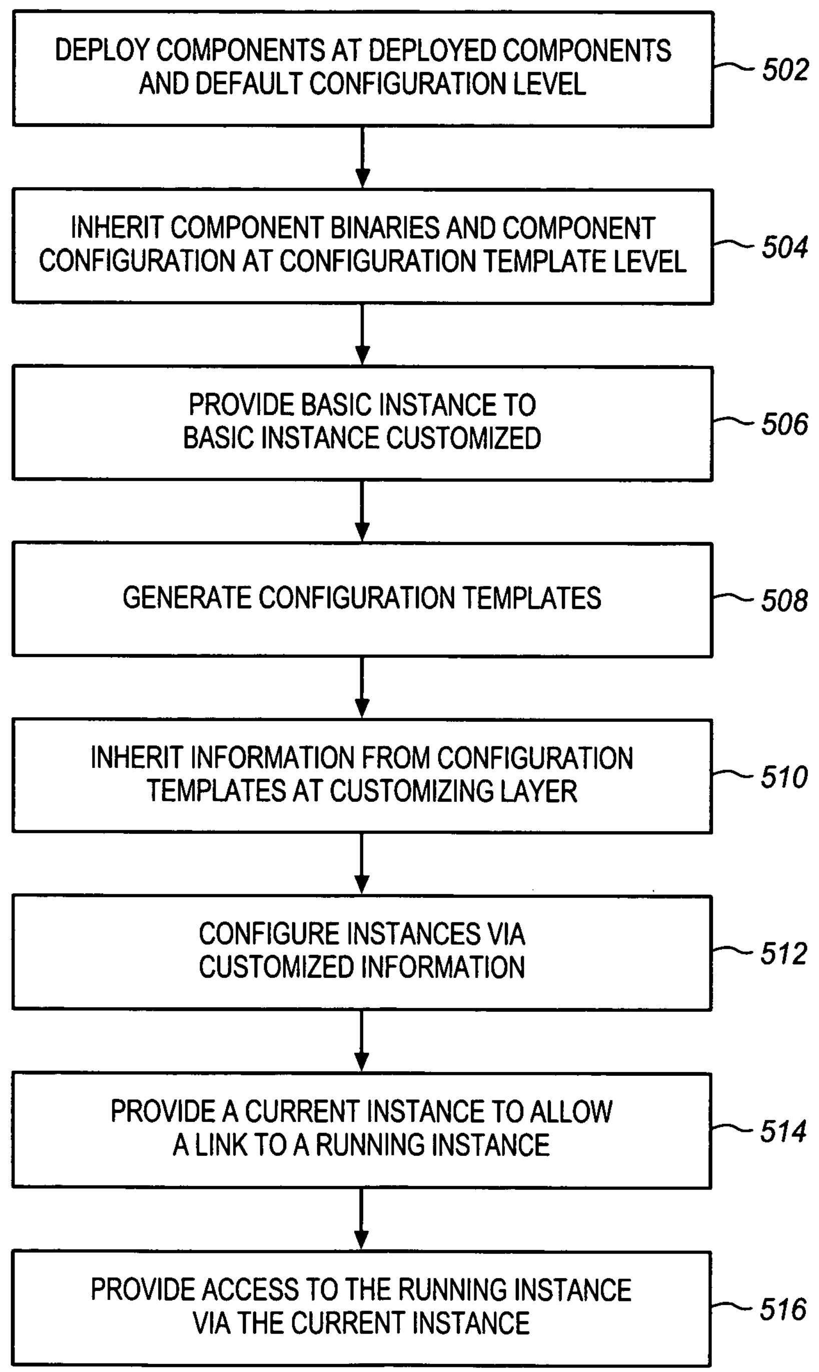
FIG. 5 illustrates an embodiment of a process for providing multiple levels in a configuration architecture.

FIG. 5 illustrates an embodiment of a process for providing multiple levels in a configuration architecture. In one embodiment, at processing block 502, various components are deployed at the deployed components and default configuration level of the configuration architecture. These components may provide component binaries and default component configurations. At processing block 504, component binaries and component configurations are inherited at the configuration template level and provided to a basic instance at processing block 506. At processing block 506, information from the basic instance is inherited at a customized basic instance a basic instance customized. In one embodiment, the customized basic instance may reside at the system configuration level, while the basic instance resides at the configuration template level.

Using the information inherited from the default configuration level, also known as the global level, various configuration templates are generated and/or customized at the configuration template level at processing block 508. A template customization and/or configuration tool may be used to customize configuration templates, such as generate and/or customize the configuration template. Examples of such templates include J2EE developer, portal+KM, minimal instance, etc. The information from these configuration templates is inherited at the customizing layer forming customized information at the system configuration level at processing block 510. For each active template, the customizing (system) layer may contain a custom template (which may, by default, be empty). For example, a template "J2EE developer" at the templates layer may have a corresponding custom template "J2EE developer" at the system layer.

The customized information via customized developers is then used to configure default instances into new configured instances at the system configuration level at processing block 512. Stated differently, customized configuration templates are applied to default instances to configure them into configured instances. Default instances may be configured via an instance configuration tool. Default and configured instances may include application server instances. Examples of instances include J2EE development instance, portal+KM instance, etc. Further, such instances are in communication with a system. At processing block 514, a current instance, which includes a virtual instance, is provided to allow a parameterized link to a running instance of one of the instances. Also, during runtime, configuration consumers are provided access to the running instance via the current instance at processing block 516.

Figure 6:
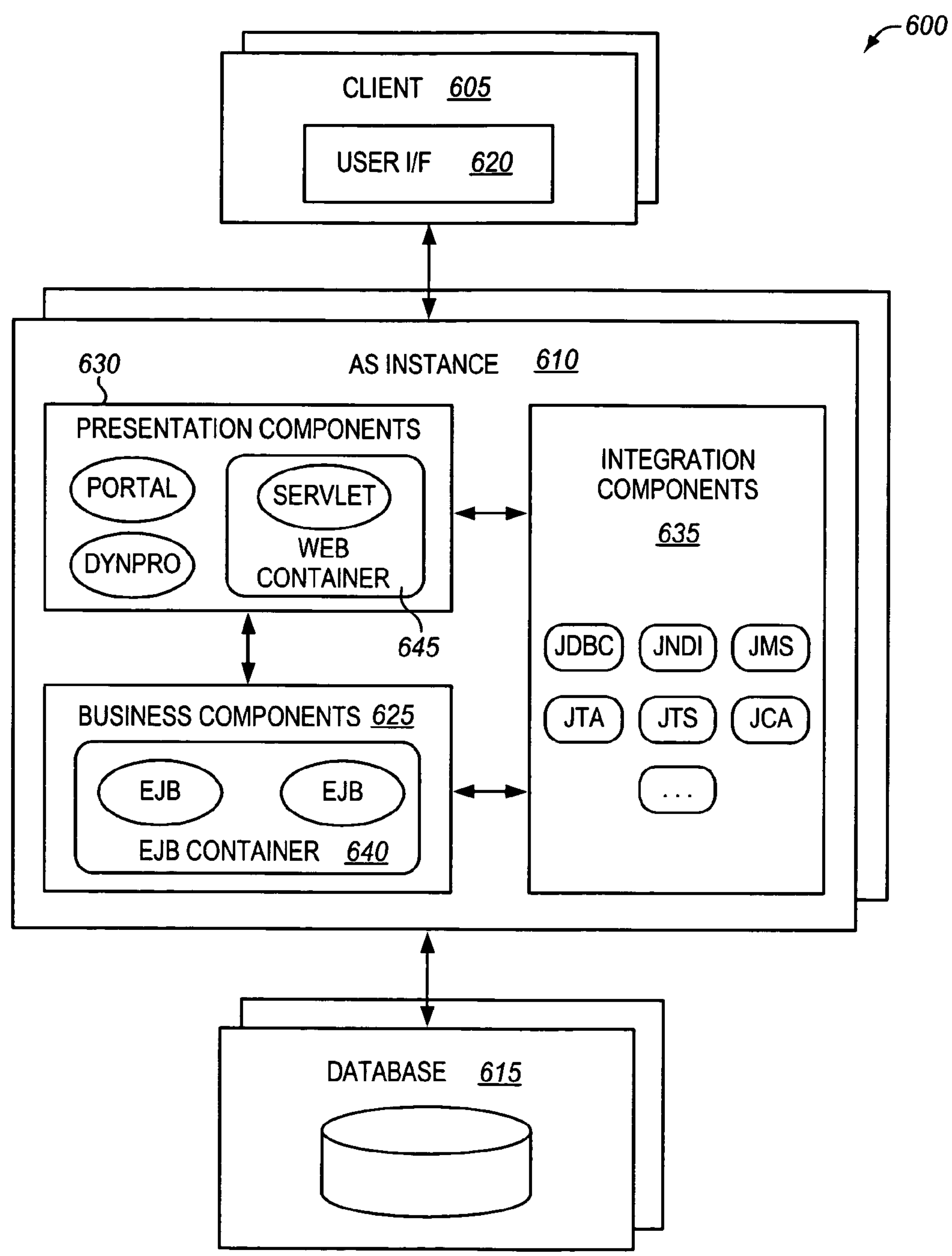
FIG. 6 illustrates an enterprise system for implementing one or more embodiments of the present invention.

FIG. 6 illustrates an enterprise system 600 for implementing one or more embodiments of the present invention. Enterprise system 600 is a multi-tier architecture implemented using a variety of different technologies at each sub-layer, including those based on the J2EE standard (e.g., J2EE Specification, Version 1.4), the Microsoft.NET standard, the Advanced Business Application Programming (ABAP) standard developed by SAP AG, and the like.

The illustrated embodiment of enterprise system 600 includes one or more clients 605 communicatively coupled to one or more application server (AS) instances 610, which are in turn communicatively coupled to one or more database 615. User interface 620 provides a GUI to enable users of clients 605 to interact with databases 615 (e.g., submit queries, input data, etc.) through AS instances 610.

AS instances 610 may each include business components 625, presentation components 630, and integration components 635, which together form subcomponents of an AS (e.g., WebAS by SAP AG). Business components 625 provide the business logic of AS instance 610, enabling complex business processes to be implemented. In a J2EE environment, business components 625 may include one or more Enterprise JavaBean (EJB) containers 640 each including one or more EJBs. EJBs are JAVA-based software modules that contain the actual business logic, while EJB container 640 encapsulates the EJBs in a JAVA-based runtime environment that provides a host of common interfaces and services to the EJBs Presentation components 630 describe the specific manner in which the results of business components 625 are formatted for display on user interface 620. The results may be formatted with aid of a web container 645 that supports both servlets and JavaServer Pages (JSPs). The servlets provide server-side processing to generate the GUI and the JSPs are extensions of the JAVA servlet technology for providing dynamic content within the GUI. For example, in WebAS, the servlets may include SAP Enterprise Portal, which provides a uniform and personalized access to various different backend systems via a browser, Web Dynpro which uses JSPs to provide a development and runtime environment for Web applications, or other presentation logic.

Integration components 635 enable access to business functionalities from external resources. This is done using various services, connectors (middleware), communication protocols, and support for general data exchange formats (e.g., extensible markup language). For example, integration components 635 may contain support for the following services: JAVA Database Connectivity (JDBC) API, the JAVA Naming and Directory Interface ("JNDI"), JMS, the JAVA Transaction Service (JTS), the JAVA Transaction API (JTA), the J2EE Connector Architecture (JCA), and the like.

A template configuration tool may provide configuration of templates corresponding to any or all of the components of enterprise system 600 described above, including the business, presentation, and integration components. Furthermore, template configuration tool may be used to configure the underlying engines that operate these components. These underlying engines may be various types of JVMs, such as the J2EE engine. In one embodiments, template configuration tool may be used to configure applications within clients 605, various components of database 615, a dispatcher for distributing work requests between AS instances 610 or an internal dispatcher within each AS instance 610, a message server, and the like.

One or more modules within or associated with the architectures and methodologies discussed above may include hardware, software, and/or a combination of these. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operation or executions described.

A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., ROM, RAM, magnetic disk storage media, optical storage media, flash memory devices, etc.), etc. The machine accessible medium may further include an electronic device having code loaded on a storage that may be executed when the electronic device is in operation. Thus, delivering an electronic device with such a code may be understood as providing the article of manufacture with such content described above. Furthermore, storing code on a database or other memory location and offering the code for download over a communication medium via a propagated signal may be understood as providing the article of manufacture with such content described above.

The architectures and methodologies discussed herein may be implemented with various types of computing systems such as an application server that includes a J2EE server that supports EJB components and EJB containers (at the business layer) and/or Servlets and JSP (at the presentation layer). Of course, other embodiments may be implemented in the context of various different software platforms including, by way of example, Microsoft®.NET, Windows®/NT, Microsoft Transaction Server (MTS), the ABAP platforms developed by SAP AG and comparable platforms.

Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit (ASIC) or the like. The order in which some or all of the process blocks appear in the processes should not be deemed limiting. Rather, one of ordinary skill in the art having the benefit of the disclosure will understand that some of the process blocks may be executed in a variety of orders not illustrated.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer-implemented method comprising:

receiving configuration information including one or more system-dependent settings adaptable to changes in a system environment;

generating configuration templates based on the configuration information, the configuration templates including one or more configuration templates associated with a usage scenario, the configuration templates are system-independent; and employing at least one configuration template to dynamically adapt a system configuration, during runtime, to the associated usage scenario and changes in the system environment, wherein the configuration templates include a set of default configuration settings to maintain compatibility with a default configuration of the system.

2. A system comprising:

a server computer system coupled with a database having an abstract configuration template, the server computer system having an application server, the application server to:

receive configuration information including one or more system-dependent settings adaptable to changes in a system environment;

generating configuration templates based on the configuration information, the configuration templates including one or more configuration templates associated with a usage scenario, the configuration templates are system-independent; and employ the at least one configuration template to dynamically adapt a system configuration, during runtime, to a usage-case scenario and chances in the system environment, wherein the configuration templates include a set of default configuration settings to maintain compatibility with a default configuration of the system.

3. A non-transitory machine-readable medium having stored thereon sets of instructions which, when executed by a machine, cause the machine to:

receive configuration information including one or more system-dependent settings adaptable to changes in a system environment;

generating configuration templates based on the configuration information, the configuration templates including one or snore configuration templates associated with a usage scenario, the configuration templates are system-independent; and employ the at least one configuration template to dynamically adapt a system configuration, during runtime, to a usage-case scenario and changes in the system environment, wherein the configuration templates include a set of default configuration settings to maintain compatibility with a default configuration of the system.

4. The method of claim 1, wherein generating the configuration templates based on the configuration information further comprises customizing at least one of the configuration templates according to the usage scenario associated with the at least one of the configuration templates.

5. The method of claim 1, wherein the one or more system-dependent settings adaptable to changes in the system environment include one or more of the following: system name, instance host, central instance host, java home, global directory, cpu count, and amount of memory.

6. The method of claim 1, wherein the one or more configuration templates having the associated usage scenario includes one or more of the following predefined instance configurations: minimal instance, portal+KM, Java 2 Platform, and Enterprise Edition (J2EE) developer.

7. The method of claim 5, wherein the one or more system-dependent settings includes one or more of the following: software platform dependent parameters, hardware platform dependent parameters, and usage scenario dependent parameters.

8. The method of claim 1, wherein the configuration templates provide instance configuration information.

9. The method of claim 8, wherein the configuration templates provides instance configuration information for one or more of the following: server nodes, Java Management System instances, and application instances.

10. The method of claim 1, wherein the one or more system-dependent settings are specified in a system-independent way.

11. The method of claim 1, wherein employing the at least one configuration template further comprises abstracting the one or more system-dependent settings by one or more of the following: parameterized settings and computed settings.

12. The method of claim 1, wherein the system-dependent settings represent dynamic settings.

13. The method of claim 8, wherein the configuration information represent component configuration information for one or more business, presentation and integration components for one or more instances.

14. The method of claim 1, wherein the configuration information includes one or more of the following: instance layout configuration, VM configuration, kernel configuration, service settings, application configuration, cluster file system configuration, and runtime filter configuration.

* * * * *